(12) United States Patent
Graf

(10) Patent No.: US 7,762,230 B2
(45) Date of Patent: Jul. 27, 2010

(54) METHOD FOR OPERATING AT LEAST ONE DRIVE MOTOR OF A MOTOR VEHICLE

(75) Inventor: Johann Graf, Hausen (DE)

(73) Assignee: Audi AG, Ingolstadt (DE)

( * ) Notice: Subject to any disclaimer, the term of this patent is extended or adjusted under 35 U.S.C. 154(b) by 232 days.

(21) Appl. No.: 12/010,370

(22) Filed: Jan. 24, 2008

(65) Prior Publication Data
US 2008/0184959 A1    Aug. 7, 2008

(30) Foreign Application Priority Data
Jan. 24, 2007    (DE)    ........................ 10 2007 003 501

(51) Int. Cl.
*F02D 41/18*    (2006.01)
(52) U.S. Cl. .................. 123/339.15; 123/351
(58) Field of Classification Search ............ 123/339.14, 123/339.15, 351
See application file for complete search history.

(56) References Cited

U.S. PATENT DOCUMENTS

| | | | | |
|---|---|---|---|---|
| 4,354,466 A | * | 10/1982 | Dudley et al. .......... | 123/339.18 |
| 5,666,917 A | * | 9/1997 | Fraser et al. ........... | 123/339.11 |
| 6,062,196 A | * | 5/2000 | Haboldt .................. | 123/339.16 |
| 6,810,853 B1 | * | 11/2004 | Wong et al. ............. | 123/339.14 |
| 2009/0183712 A1 | * | 7/2009 | Owens et al. .......... | 123/339.18 |

FOREIGN PATENT DOCUMENTS

| | | |
|---|---|---|
| DE | 37 38 394 | 8/1988 |
| DE | 41 38 336 A1 | 5/1993 |
| DE | 600 15 605 T2 | 10/2005 |

* cited by examiner

*Primary Examiner*—Erick Solis
(74) *Attorney, Agent, or Firm*—Novak Druce + Quigg LLP

(57) ABSTRACT

The invention relates to a method for operating at least one drive motor, particularly an internal combustion engine, of an automobile, particularly a motor vehicle, wherein the engine speed of the drive motor in the detected idle state of the motor vehicle does not exceed a predetermined maximum value by means of engine speed limitation. It is provided that the idle state detected is verified at least once by means of a test cycle.

9 Claims, 1 Drawing Sheet

METHOD FOR OPERATING AT LEAST ONE DRIVE MOTOR OF A MOTOR VEHICLE

CROSS-REFERENCE TO RELATED APPLICATIONS

This application claims priority from German Application No. 10 2007 003 501.4 filed Jan. 24, 2007, hereby incorporated by reference in its entirety.

The invention relates to a method for operating at least one drive motor, particularly an internal combustion engine, of an automobile, particularly a motor vehicle, wherein the engine speed of the drive motor in the detected idle state of the motor vehicle does not exceed a predetermined maximum value by means of engine speed limitation.

BACKGROUND OF THE INVENTION

Such a method is already known. DE 37 38 394 C1 discloses a respective device for limiting the engine speed of an internal combustion engine driving a motor vehicle at the detected idle state of the motor vehicle in order to exclude any random, unnecessary, but noise-intensive "revving up" of the internal combustion engine. The idle state of the motor vehicle is detected by the tachometer of the motor vehicle by means of a speed signal. Since the speed signal of the tachometer is configured to indicate a speed of the motor vehicle, which is to be stated as a speed range of the idle state (v=0) up to a speed above the maximum speed of a motor vehicle, the detection of whether an idle state of the motor vehicle is present or not, is not always unambiguously possible. If the speed signal of a tachometer, for example, is an impulse sequence, in which the number of impulses per time unit is proportional to the speed of the motor vehicle, the detection of the idle state of the motor vehicle does not occur until after a long detection time, in which no further impulses follow the last impulse. A reading error of the speed signal taints the detection result in case of an idle state, or very low speeds of the motor vehicle, much stronger than it would within a range of high speeds.

The principal object of the invention is to provide a method that very reliably indicates the detected idle state only with an actual idle state of the motor vehicle.

SUMMARY OF THE INVENTION

In achieving the object of the invention, it is provided that the detected idle state is verified at least once by means of a test cycle. The verifying of the detected idle state in conjunction with the method according to the invention is to be construed as the testing of the detected idle state by means of a test cycle, which is independent of the detection of the idle state also performed. Thus, two independent manners are being described. In the case of the verification of the accuracy of the detected idle state of a motor vehicle, the engine speed of a drive motor of a motor vehicle is limited to the maximum value. The drive motor is particularly an internal combustion engine. If the accuracy of the idle state detected is not verified by the test cycle, the engine speed limitation is not set to the maximum value. The method according to the invention therefore does not limit the engine speed of the drive motor by means of engine speed limitation to the preset maximum value, until the idle state of the motor vehicle has been detected and verified. This limitation occurs at a particularly high reliability of the fact that the idle state detected corresponds to an actual idle state of the motor vehicle.

It is further provided that the idle state is detected by means of a speed signal. It is advantageously provided that the speed signal is supplied by a drive assisting device of the motor vehicle. The drive assisting device is particularly an electronic stability program (ESP), an antilock brake system (ABS), an anti-slip control (ASR), and/or a road handling control (FDR). Measuring devices with signals are associated to these drive assisting devices, which supply at least one signal to the respective drive assisting device, from which the idle state of the motor vehicle can be detected, or which is the speed signal itself. It is advantageously provided that the speed signal is supplied by a braking device of the motor vehicle. The braking device in this sense should not be understood as the sum of braking of the motor vehicle, but rather as a complete braking system, such as one having an ESP.

According to a further development of the invention it is provided that the verification is performed by means of a test step, in which it is determined whether an idle state is not present. In case the test step has determined no idle state of the motor vehicle, the engine speed limitation is not set to the maximum value. It is advantageously provided that it is detected in the test step, whether an increased engine speed, which is larger than the idle engine speed, and a positive-fit position of a drive clutch of the motor vehicle are present. In case of an increased engine speed, which is, for example, detected via a motor control device of the drive motor, it must be assumed in conjunction with a positive-fit position of the drive clutch of the vehicle that no idle state of the motor vehicle is present (v>0 km/h). It is advantageously provided that the positive-fit position of the drive clutch is detected by means of a predetermined load signal, and by means of a resulting engine speed gradient, particularly an engine speed rev-up gradient. If the amount of the ratio of the engine speed gradient, particularly an engine speed rev-up gradient, resulting from the load signal is below a predetermined threshold value, the drive clutch is in a positive-fit position. The load signal is particularly a target load signal that is proportional to the open position of a throttle in the air system of the internal combustion engine. The load signal is preferably proportional to a gas pedal position. Thus, in dependency of the gas pedal position, the engine speed rev-up gradient is determined and it is detected, whether a positive-fit position of the drive clutch is present.

BRIEF DESCRIPTION OF THE DRAWING

The drawing shows a flow chart of a method according to the invention.

DETAILED DESCRIPTION OF AN EMBODIMENT OF THE INVENTION

Figure 1:
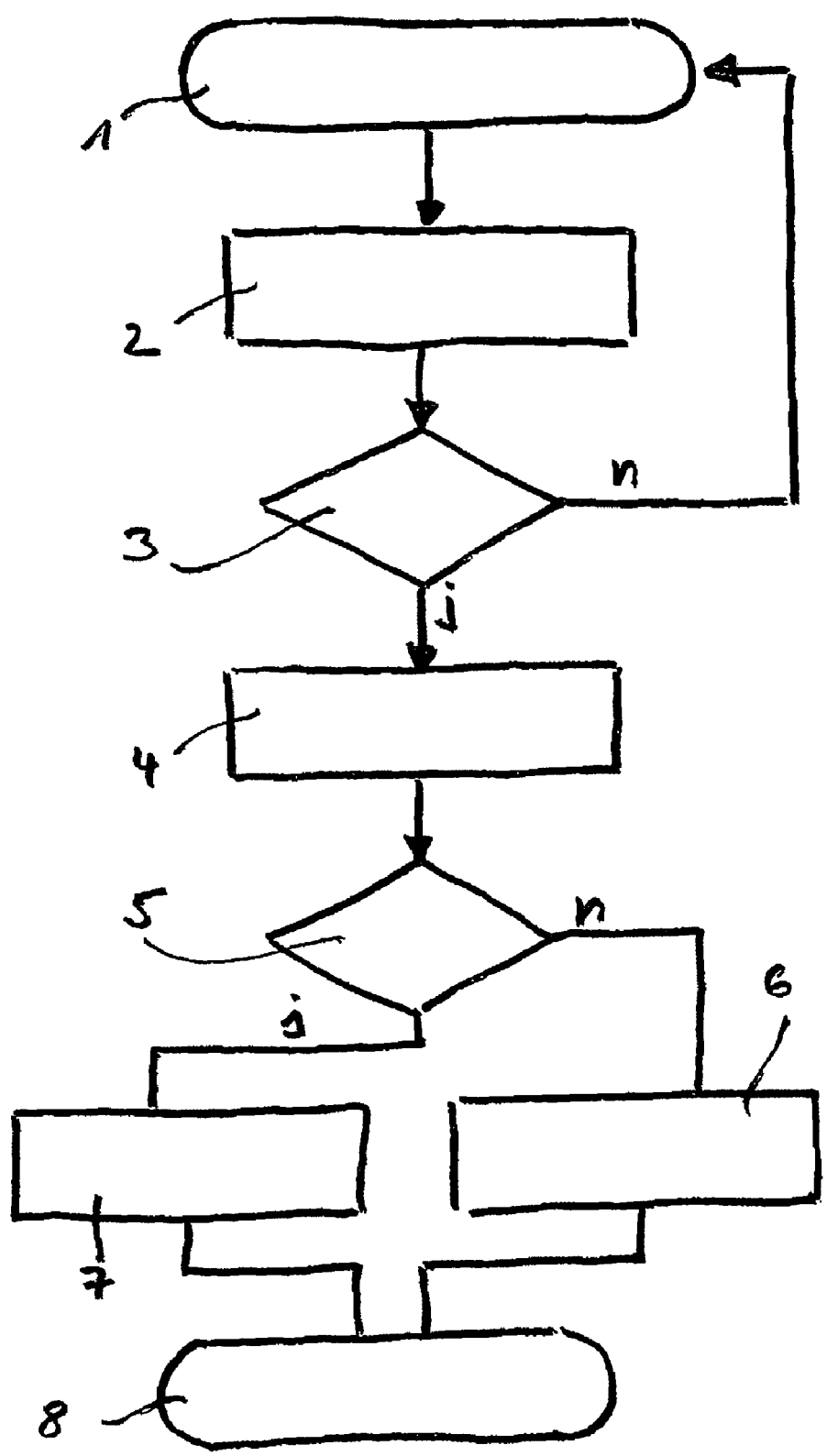

The method starts with a starting point 1, in which a drive motor of a motor vehicle embodied as an internal combustion engine may be at any desired operating state. The motor vehicle is particularly a motor vehicle having a manual transmission. The starting point refers to a program point 2, in which an electronic stability program supplies a speed signal to a motor control device of the internal combustion engine. The motor control device detects, whether a detected idle state of the motor vehicle is present, or not. The program point 2 refers to a query 3, in which it is tested, whether a detected idle state of the motor vehicle is present. If this is not the case, it refers back to the starting point 1 along the path designated with the letter n (no). If a detected idle state of the motor vehicle is present, it is branched to program point 4 along the path designated with j (yes). With program point 4, verification of the detected idle state is performed by means of a test cycle. It involves a test step, in which it is determined, whether an increased engine speed, which is larger than the idle engine speed, and a positive-fit position of the drive clutch of the motor vehicle are present. The increased engine speed is detected via a motor control device of the internal combustion engine. The positive-fit position of the drive clutch of the motor vehicle is evident from a ratio of the engine speed gradient of a predetermined load signal to the load signal itself. If the ratio is below a predetermined threshold value, the drive clutch is in a positive-fit position. For this purpose, the engine speed gradient, particularly an engine speed rev-up gradient, is utilized, in that in dependency of the position of the gas pedal of the motor vehicle, and of an engine speed gradient, particularly an engine speed rev-up gradient, the positive-fit position is detected. Program point 4 refers to a query 5, in which it is tested, whether the accuracy of the idle state detected is verified by means of the text cycle. If this is not the case, it refers to program point 6 along the path designated with the letter n, in which the engine speed limitation is not set to the maximum value. If the accuracy of the idle state detected is verified during the query, it refers to program point 7 along the path designated with j. In program point 7 the engine speed limitation is set to the maximum value so that the engine speed of the drive motor is not able to exceed the predetermined maximum value by means of the engine speed limitation. Program points 6 and 7 each refer to an end point 8. Said end point, for example, refers back to the starting point 1.

The drive motor of the motor vehicle has a maximum engine speed value independent of the maximum value. This maximum engine speed value is "regulated" either by means of the power limits of the drive motor, or—in case of a correspondingly powerful drive motor—by means of the limitation of power. This regulation serves particularly for operating the drive motor with operating parameters that correspond to the actual operating conditions.

LIST OF REFERENCE SYMBOLS

1 starting point
2 program point
3 query
4 program point
5 query
6 program point
7 program point
8 end point

The invention claimed is:

1. A method for operating at least one drive motor, particularly an internal combustion engine, of an automobile, particularly a motor vehicle, wherein the engine speed of the drive motor in the detected idle state of the motor vehicle does not exceed a predetermined maximum value by means of engine speed limitation, wherein the detected idle state is verified at least once by means of a test cycle.

2. The method according to claim 1 wherein, the idle state is detected by means of a speed signal.

3. The method according to claim 2 wherein the speed signal is supplied by a braking device of the motor vehicle.

4. The method according to claim 2 wherein the speed signal is supplied by a drive assisting device of the motor vehicle.

5. The method according to claim 1 wherein the verification is performed by means of a test step, in which it is determined, whether an idle state is not present.

6. The method according to claim 1 wherein it is detected in the test step, whether an increased engine speed, which is higher than the idle engine speed, and a positive-fit position of a drive clutch of the vehicle are present.

7. The method according to claim 6 wherein the positive-fit position is detected in dependency of a load signal and an engine speed gradient, particularly an engine speed rev-up gradient.

8. The method according to claim 7 wherein the positive-fit position is detected in dependency of the position of a gas pedal of the motor vehicle, and an engine speed gradient, particularly an engine speed rev-up gradient.

9. The method according to claim 2 wherein the maximum value is smaller than a maximum engine speed value.

* * * * *